(12) United States Patent
Kim et al.

(10) Patent No.: US 6,205,279 B1
(45) Date of Patent: Mar. 20, 2001

(54) SINGLE MODE OPTICAL FIBER HAVING MULTI-STEP CORE STRUCTURE AND METHOD OF FABRICATING THE SAME

(75) Inventors: Jin-han Kim; Mun-hyun Do; Ji-hoon Lee, all of Gumi (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/186,628

(22) Filed: Nov. 6, 1998

(30) Foreign Application Priority Data

Nov. 6, 1997 (KR) .................................. 97-58425

(51) Int. Cl.$^7$ ........................................ G02B 6/02
(52) U.S. Cl. ............................. 385/127; 385/124
(58) Field of Search .................... 385/126–128, 385/123, 124

(56) References Cited

U.S. PATENT DOCUMENTS

| | | |
|---|---|---|
| 4,106,850 | 8/1978 | Marcatili . |
| 4,306,767 | 12/1981 | Kawachi et al. . |
| 4,435,040 | 3/1984 | Cohen et al. . |
| 4,465,334 | * 8/1984 | Siemsen et al. ............... 385/127 |
| 4,516,826 | 5/1985 | Paek . |
| 4,715,679 | 12/1987 | Bhagavatula . |
| 4,822,399 | 4/1989 | Kanamori et al. . |
| 5,361,319 | 11/1994 | Antos et al. . |
| 5,559,921 | 9/1996 | Terasawa et al. . |
| 5,613,027 | 3/1997 | Bhagavatula . |
| 5,673,354 | 9/1997 | Akasaka et al. . |
| 5,732,178 | 3/1998 | Terasawa et al. . |
| 5,742,723 | 4/1998 | Onishi et al. . |
| 5,748,824 | 5/1998 | Smith . |
| 5,761,366 | 6/1998 | Oh et al. . |
| 5,822,488 | 10/1998 | Terasa wa et al. . |

FOREIGN PATENT DOCUMENTS

| | | |
|---|---|---|
| 3-18161 | 3/1991 | (JP) . |
| 5-155639 | 6/1993 | (JP) . |
| 10-78524 | 3/1998 | (JP) . |
| 10-186156 | 7/1998 | (JP) . |

* cited by examiner

Primary Examiner—Darren Schuberg
Assistant Examiner—Fayez Assaf
(74) Attorney, Agent, or Firm—Robert E. Bushnell, Esq.

(57) ABSTRACT

An optical fiber having a multi-step core structure, and a method of fabricating the same, are provided. The optical fiber includes a central core having a predetermined radius a1 from an central axis and a refractive index n1, a first outer core having a radius a2 and a refractive index n2 smaller than the refractive index n1 and surrounding the central core, a second outer core having a radius a3 and a refractive index n3 smaller than the refractive index n2 and surrounding the first outer core, and a cladding having a radius a4 and a refractive index n0 smaller than the refractive index n3 and surrounding the second outer core, i.e., a1<a2<a3<a4 and n1>n2>n3>n0. The diameter of the core is increased by making the refractive index distribution of the core multi-stepped, thus providing easy fabrication. The optical fiber has a low dispersion value in a 1550 nm wavelength, thus making superspeed long distance transmission possible.

8 Claims, 8 Drawing Sheets

SINGLE MODE OPTICAL FIBER HAVING MULTI-STEP CORE STRUCTURE AND METHOD OF FABRICATING THE SAME

CLAIM OF PRIORITY

This application makes reference to, incorporates the same herein, and claims all benefits accruing under 35 U.S.C §119 from an application entitled *Single Mode Optical Fiber Having Multi-Step Core Structure And Method For Fabricating The Same* earlier filed in the Korean Industrial Property Office on Nov. 6, 1997, and there duly assigned Serial No. 97-58425 by that Office.

BACKGROUND OF THE INVENTION

1. Field of the Invention

The present invention relates to a single mode optical fiber having low dispersion and low loss in a 1550 nm wavelength baseband, and more particularly, to an optical fiber having a multi-step core structure and a method of fabricating the same.

2. Description of the Related Art

As techniques for super high speed optical transmission and large capacity communications are rapidly being developed of late, loss and dispersion of an optical fiber restrict transmission at super high speeds and with large capacity. In order to overcome the restriction due to optical fiber loss, a single mode fiber of silica uses a 1550 nm wavelength region in which the loss value is the lowest, and uses an optical amplifier which can amplify an optical signal in the 1550 nm wavelength region. Accordingly, the loss no longer restricts the large capacity transmission at super high speeds, and control of the dispersion is being mentioned as a relatively important technical problem.

However, a typical single mode optical fiber, the most widely used at the present time, is designed to have a dispersion value of zero in a 1310 nm wavelength region. Thus, even though loss is low in a 1550 nm wavelength region, the dispersion value is high in that region, thus limiting use of the 1550 nm wavelength.

In general, total dispersion of the single mode fiber is determined by the sum of material dispersion and waveguide dispersion. Here, the material dispersion is determined by the peculiar properties of a material forming an optical fiber, and waveguide dispersion is determined by the structure of the optical fiber.

Figure 1:
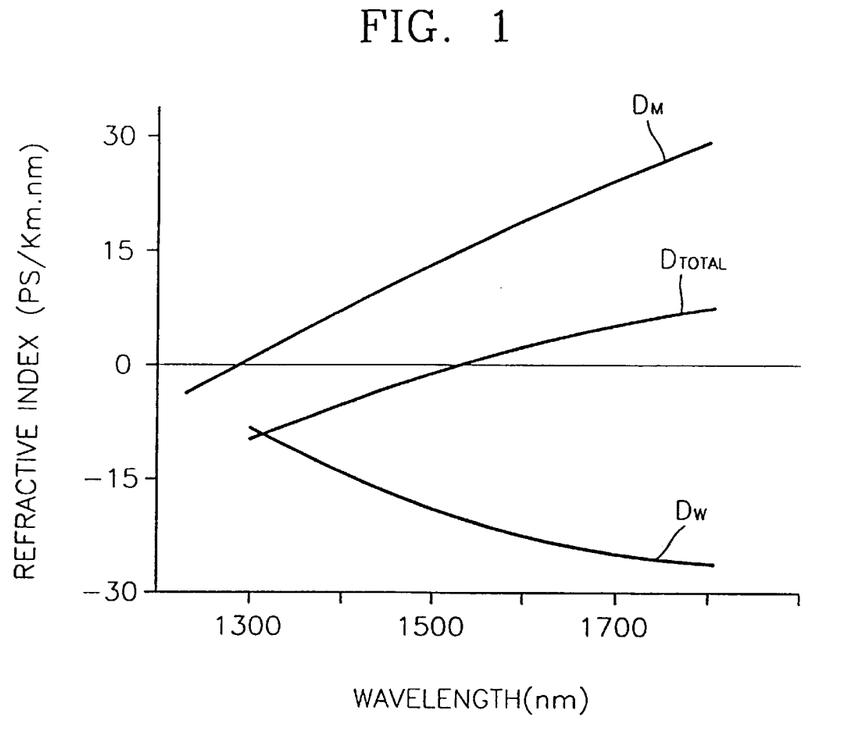
FIG. 1 is a graph illustrating the relationship between material dispersion, waveguide dispersion, and total dispersion of a conventional 1550 nm single mode optical fiber.

FIG. 1 is a graph illustrating the relationship between the material dispersion, the waveguide dispersion, and the total dispersion of a conventional 1550 nm single mode fiber. FIG. 1 describes the relationship between the material and waveguide dispersions depending on the wavelength of an optical signal in a single mode fiber having zero dispersion in a wavelength region of about 1550 nm. As shown in FIG. 1, the material dispersion $D_M$ appears because a long wavelength optical signal is quickly propagated and a short wavelength optical signal is slowly propagated as the refractive index varies according to the wavelength of an optical signal, and has a positive dispersion value in a wavelength region of about 1300 nm or higher. The waveguide dispersion $D_W$ has a negative dispersion value as opposed to the material dispersion. As a result, total dispersion $D_{TOTAL}$ is determined as shown in FIG. 1, and a wavelength where the total dispersion $D_{TOTAL}$ is "0" is called a zero dispersion wavelength.

Thus, the total dispersion $D_{TOTAL}$ can be lowered in a wavelength region to be used, by appropriately adjusting the material dispersion $D_M$ and the waveguide dispersion $D_W$. However, a material of the optical fiber must be changed to control dispersion due to the material. Thus, a method of varying the waveguide dispersion $D_W$ is used to control the total dispersion value of the single mode fiber. Here, the waveguide dispersion $D_W$ can be controlled by adjusting the core diameter of an optical fiber, the distribution of refractive indices of a core and a cladding, and the difference between the refractive indices thereof. In other words, in order to fabricate a single mode fiber having a low dispersion value in the 1550 nm wavelength region having low loss, the refractive index of the core of an optical fiber must be increased, and the diameter of the core must be reduced, as compared to a typical single mode optical fiber for a 1310 nm wavelength.

Figure 2A:
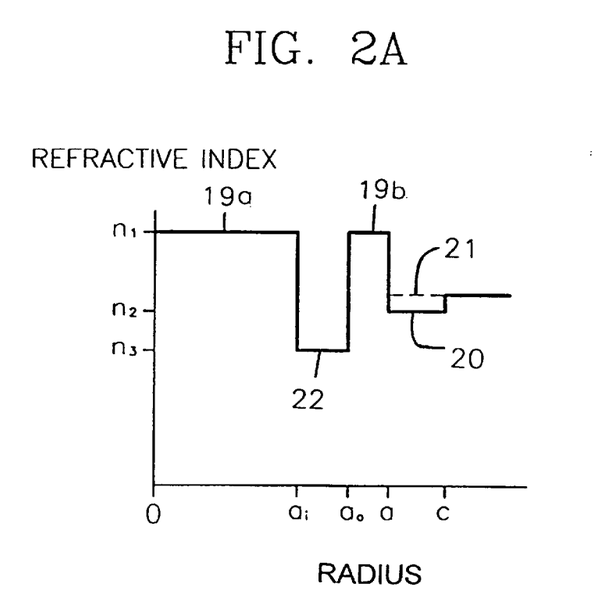
FIGS. 2A and 2B are graphs illustrating the refractive index profile of a conventional optical fiber.
Figure 2B:
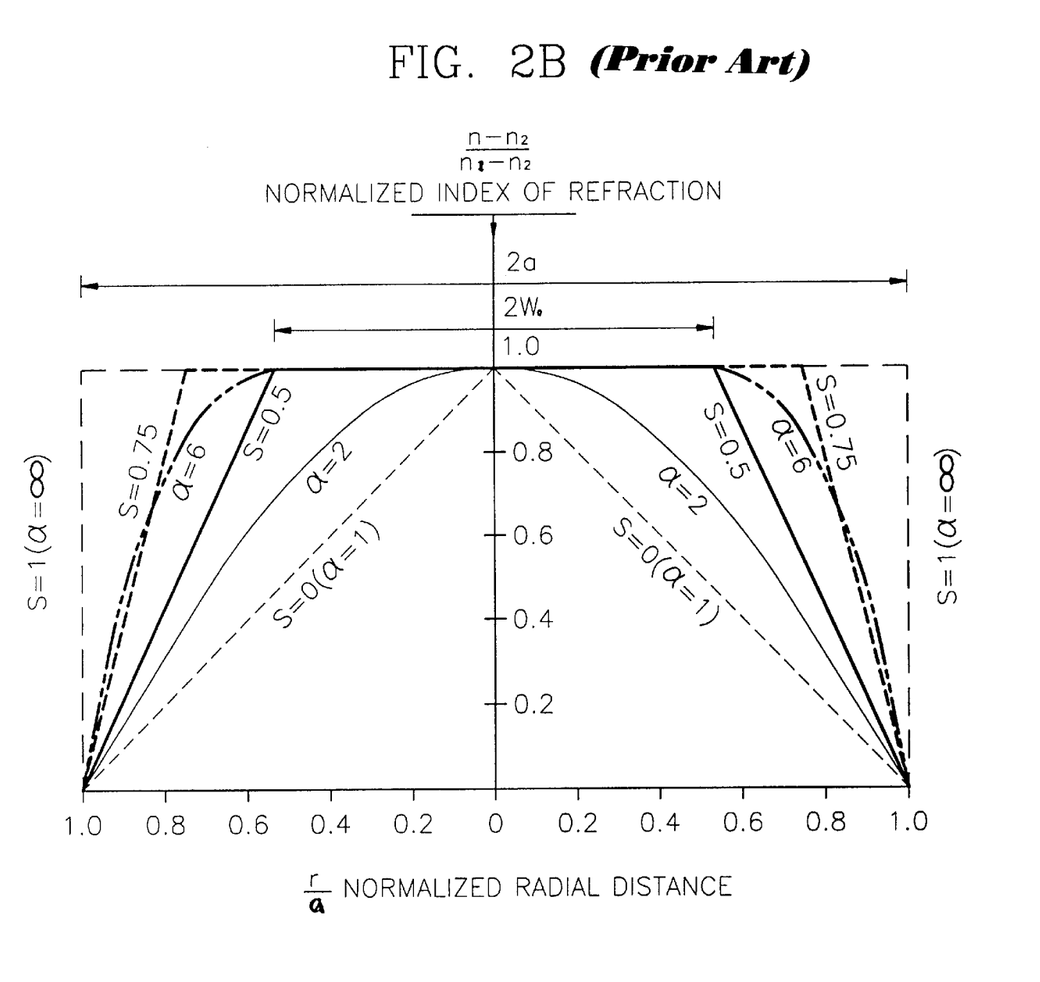

A profile having a refractive index as shown in FIG. 2A is disclosed in, and incorporated by referrence to, U.S. Pat. No. 4,715,679 to Venkata A. Bhagavatula entitled *Low Dispersion, Low-Loss Single Mode Optical Waveguide*, and a profile having a refractive index as shown in FIG. 2B is disclosed in, and incorporated by reference to, U.S. Pat. No. 4,516,826 to Un-Chul Paek entitled *Single Mode Lightguide Fiber Having A Trapezoidal refractive Index Profile.*

In U.S. Pat. No. 4,516,826, in which the distribution of the refractive index of the core is triangular or trapezoidal, as shown in FIG. 2B, a core diameter 2*a* and a mode field diameter 2Wo are smaller than those of the typical single mode fiber for a 1310 nm wavelength, and a dispersion value is low in the 1550 nm wavelength region by controlling the waveguide dispersion. However, such a structure must accurately control a geometrical structure, since a connection loss ($\alpha=4.3(a/Wo)^2$), upon connection of optical fibers to each other increases when the diameters of the core and mode field, are small, and since a micro-bending loss of an optical fiber rapidly increases when the core diameter is remarkably diminished to control the waveguide dispersion. Therefore, in U.S. Pat. No. 4,516,826, the distribution of the refractive index of the core is to be trapezoidal in order to reduce the micro-bending loss of an optical fiber.

An accurate process control is required, however, to fabricate an optical fiber having a small core diameter and a triangle refractive index profile of a core. Particularly, when an optical fiber having a triangular profile is manufactured by modified chemical vapor deposition (MCVD), a center dip phenomenon where a refractive index dips at a core center occurs. Thus, a more accurate process control is required to fabricate an optical fiber having a desired core diameter and a desired core refractive index, making it difficult to reproduce the process.

Other known single-mode optical fibers and their fabrication process are contemplated by U.S. Pat. No. 4,106,850 to E. Marcatili entitled *Optical Fiber With Graded Index Core And Pure Silica Cladding;* U.S. Pat. No. 4,306,767 to M. Kawachi et al. entitled *Singel-Mode Optical Fiber;* U.S. Pat. No. 4,435,040 to L. Cohen et al. entitled *Double-clad Optical Fiberguide;* U.S. Pat. No. 4,822,399 to H. Kanamori et al. entitled *Glass Preform For Dispersion Shied Single Mode Optical Fiber And Method For The Production Of The Same;* U.S. Pat. No. 5,361,319 to A. Antos et al. entitled *Dispersion Compensating Devices And Systems;* U.S. Pat. No. 5,559,921 to Y. Terasawa entitled *Single Mode Optical Fiber;* U.S. Pat. No. 5,613,027 to V. Bhagavatula entitled *Dispersion Shifted Optical Waveguide Fiber;* U.S. Pat. No. 5,673,354 to Y. Akasaka et al. entitled *Dispersion Compensating Optical Fiber;* U.S. Pat. No. 5,732,178 to Y. Terasawa et al. entitled *Single Mode Optical Fiber;* U.S. Pat. No. 5,742,723 to M Onishi et al. entitled *Optical Transmission*

System With Dispersion Compensating Optical Fiber; U.S. Pat. No. 5,748,824 to D. Smith entitled Positive Dispersion Optical Waveguide; U.S. Pat. No. 5,761,366 to S. Oh et al. entitled Optical Fiber With Smooth Core Refractive Index Profile And Method of Fabrication; and U.S. Pat. No. 5,822,488 to Y. Terasawa et al. entitled Single-mode Optical Fiber With Plural Core Portions, incorporated herein by reference.

SUMMARY OF THE INVENTION

To solve the above problem, it is an objective of the present invention to provide a single mode optical fiber with a multi-step core which has low dispersion and low loss in a 1550 nm wavelength band that can be easily manufactured and easily reproduced.

It is another objective of the present invention to provide a method of manufacturing a single mode optical fiber having a multi-step core.

Accordingly, to achieve the first objective, there is provided a single mode optical fiber comprising: a central core having a predetermined radius a1 from an central axis and a refractive index n1; a first outer core having a radius a2 and a refractive index n2 smaller than the refractive index n1 and surrounding the central core; a second outer core having a radius a3 and a refractive index n3 smaller than the refractive index n2 and surrounding the first outer core; and a cladding having a radius a4 and a refractive index n0 smaller than the refractive index n3 and surrounding the second outer core.

To achieve the second objective, there is provided a method of fabricating a single mode optical fiber, comprising the steps of: forming a central core having a predetermined diameter and a predetermined refractive index; forming a first outer core surrounding the central core and having a refractive index smaller than the refractive index of the central core; forming a second outer core surrounding the first outer core wherein the second outer core has a refractive index smaller than that of the first outer core and sequentially surround the central core; and forming a cladding surrounding the second outer core, and which has a refractive index smaller than the refractive index of the second outer core.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DESCRIPTION OF THE PREFERRED EMBODIMENT

When it is determined that a detailed description of associated well-known functions and the configuration in describing the present invention may obscure the gist of the present invention, the detailed description will be omitted.

Figure 3:
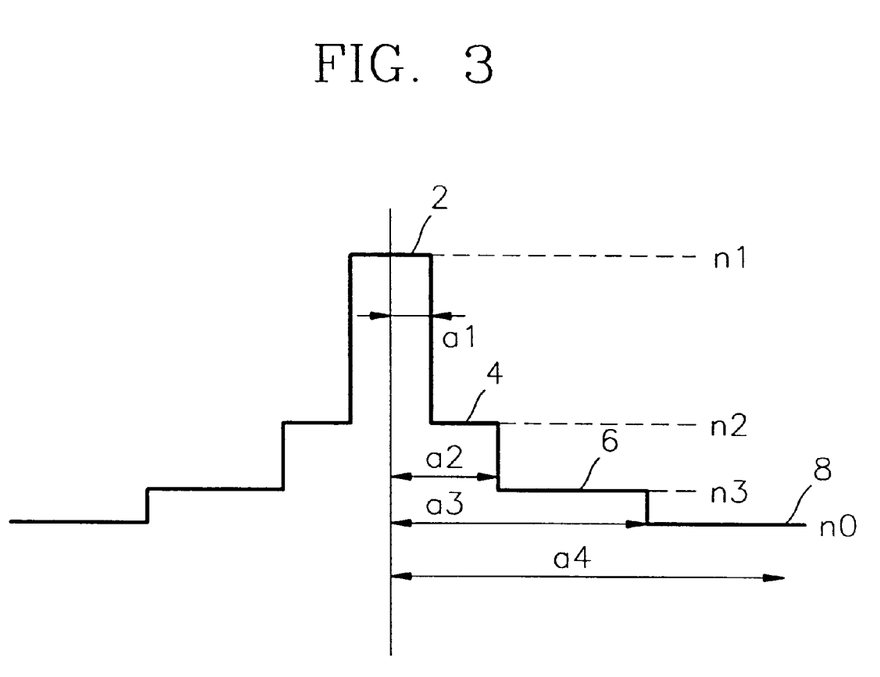
FIG. 3 illustrates distribution of the refractive index of a single mode optical fiber having a multi-step core according to an embodiment of the present invention.

Referring to FIG. 3, a central core 2 has a radius a1 from a central axis and a refractive index n1. A first outer core 4, having a radius a2 and a refractive index n2 lower than the refractive index n1, surrounds the central core 2. A second outer core 6, having a radius a3 and a refractive index n3 smaller than the refractive index n2, surrounds the first outer core 4. Finally, a cladding 8, having a radius a4 and a refractive index n0 smaller than the refractive index n3, surrounds the second outer core 6.

The refractive indices of the first and second outer cores 4 and 6 can be any distribution of refractive index expressed by the following Equation 1:

$$n(r) = n_1\left(1 - \Delta\left(\frac{r}{a}\right)^\alpha\right) \qquad (1)$$

wherein r is the radius, a is the radius of a core, $\alpha$ is the refractive index profile parameter, $n_1$ is the refractive index at the center of the optical fiber, $\Delta = (n_1^2 - n_2^2)/2n_1^2$, and $n_2$ is the cladding index, which may be approximated to $\Delta = (n_1 - n_2)/n_1$ when the difference between n1 and n2 is very small. Accordingly, when a is equal to 1, the refractive index profile is triangular or cone-shaped. When $\alpha$ is equal to 2, the refractive index profile has a parabolic or hill shape, and when $\alpha$ is equal to $\infty$, the refractive index profile is stepped.

FIGS. 4A through 7C show the simulated results of the properties of an optical fiber having a profile where the refractive index of the second outer core becomes smaller from the boundary surface with the first outer core to the boundary surface with the cladding.

Figure 4A:
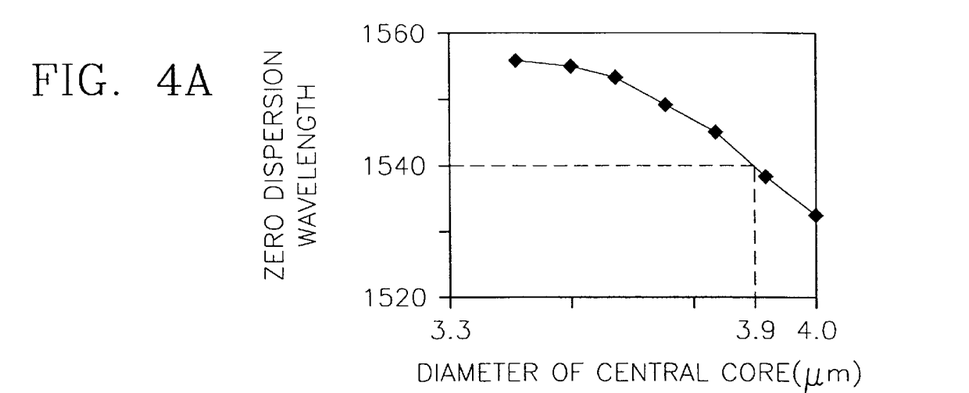
FIGS. 4A through 4C are graphs illustrating the relationship between a central core diameter and a zero dispersion wavelength, the relationship between a first outer core diameter and the zero dispersion wavelength, and the relationship between a second outer core diameter and the zero dispersion wavelength, respectively.
Figure 4B:
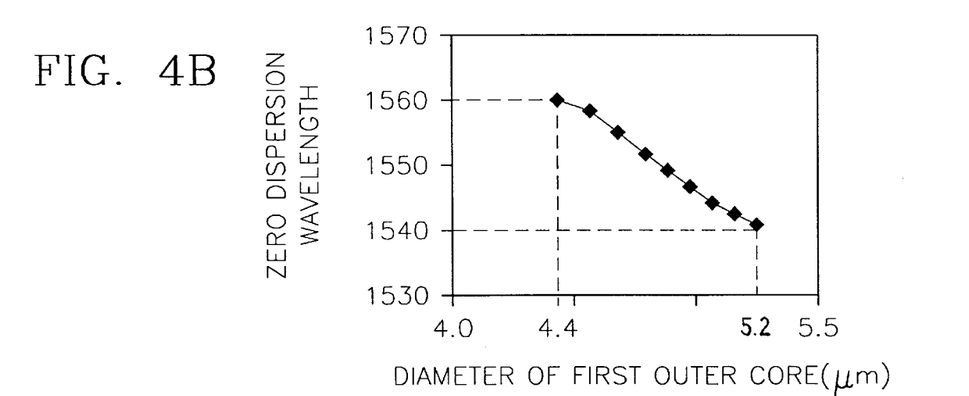
Figure 4C:
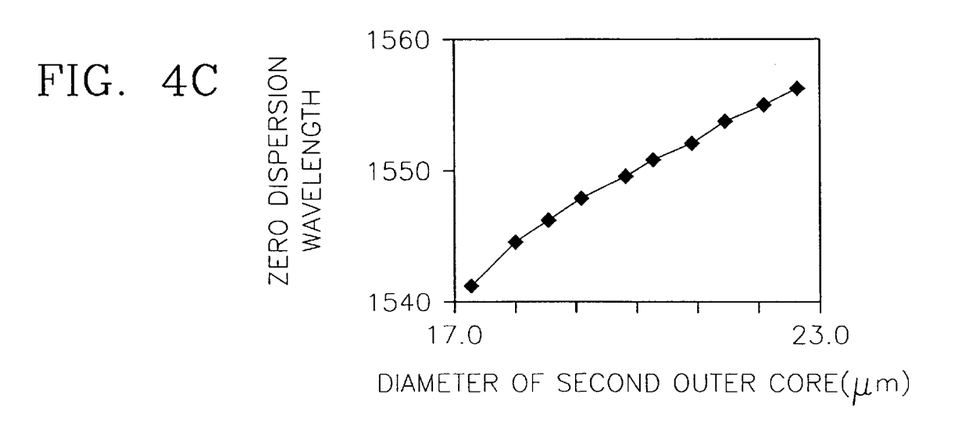

FIGS. 4A through 4C are graphs illustrating the relationship between the diameter ($\mu$m) of a central core 2 and a zero dispersion wavelength (nm), the relationship between the diameter ($\mu$m) of a first outer core 4 and the zero dispersion wavelength (nm), and the relationship between the diameter (μm) of a second outer core 6 and the zero dispersion wavelength (nm), respectively. Referring to FIG. 4A, when the diameter of the central core 2 is about 3.3 μm, the zero dispersion wavelength is 1560 nm. When the diameter of the central core 2 is about 3.9 μm, the zero dispersion wavelength is 1540 nm. Accordingly, the diameter of the central core must be between 3.3 μm and 3.9 μm to make the zero dispersion wavelength between 1540 nm and 1560 nm. Referring to FIGS. 4B and 4C, when the diameter of the first outer core is about 4.4 to 5.2 μm, and when the diameter of the second outer core is about 17.5 to 23.5 μm, the zero dispersion wavelength is between 1540 nm and 1560 nm.

Figure 5A:
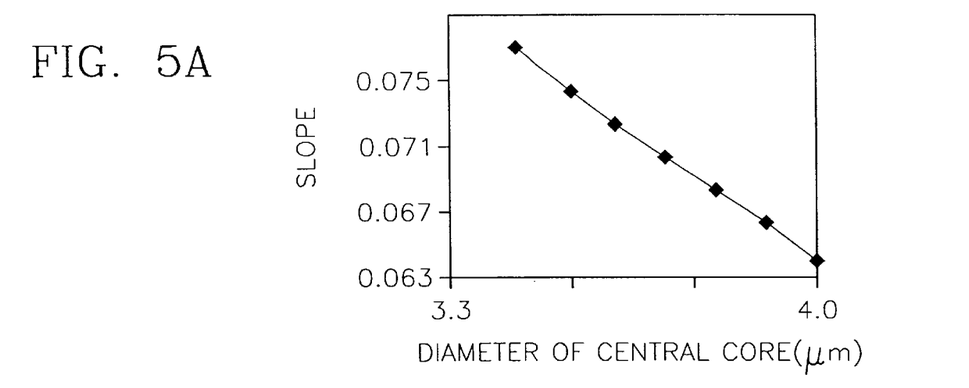
FIGS. 5A through 5C are graphs illustrating the relationship between the central core diameter and a zero dispersion slope, the relationship between the first outer core diameter and the zero dispersion slope, and the relationship between the second outer core diameter and the zero dispersion slope, respectively.
Figure 5B:
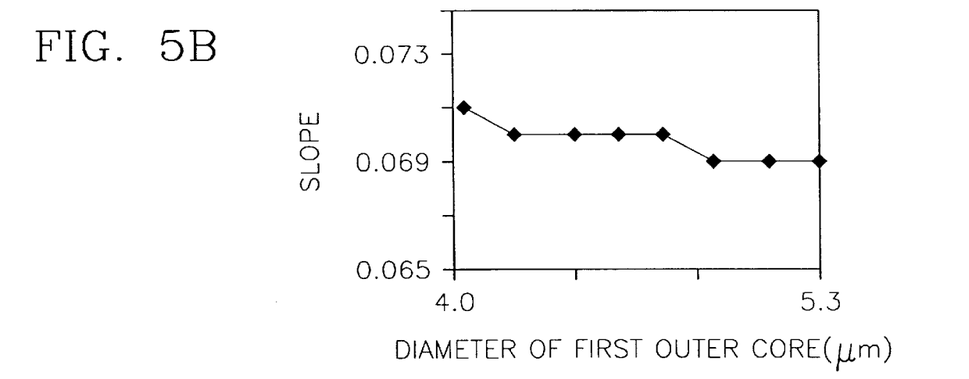
Figure 5C:
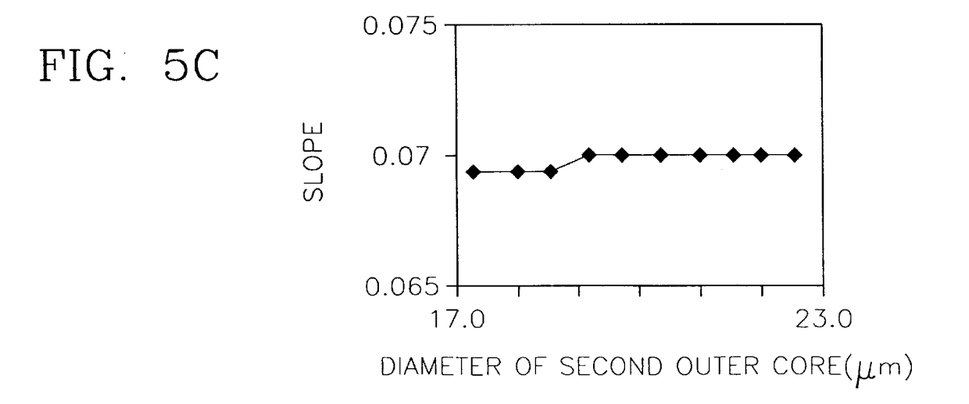

FIGS. 5A through 5C are graphs illustrating the relationship between the diameter (μm) of the central core 2 and a zero dispersion slope (ps/nm$^2$/Km), the relationship between the diameter (μm) of the first outer core 4 and the zero dispersion slope (ps/nm$^2$/Km), and the relationship between the diameter (μm) of the second outer core 6 and the zero dispersion slope (ps/nm$^2$/Km), respectively. It can be seen that if an optical fiber has a diameter (see FIGS. 4A through 4C) allowing the zero dispersion wavelength to exist between 1540 nm and 1560 nm, the zero dispersion slope is generally between 0.068 and 0.072.

Figure 6A:
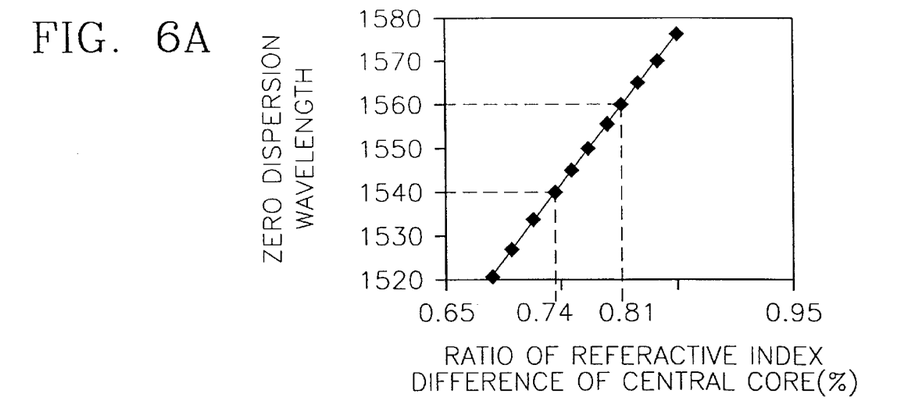
FIGS. 6A through 6C are graphs illustrating the relationship between the ratio of refractive index difference of a central core and a zero dispersion wavelength, the relationship between the ratio of refractive index difference of a first outer core and the zero dispersion wavelength, and the relationship between the ratio of refractive index difference of a second outer core and the zero is dispersion wavelength, respectively.
Figure 6B:
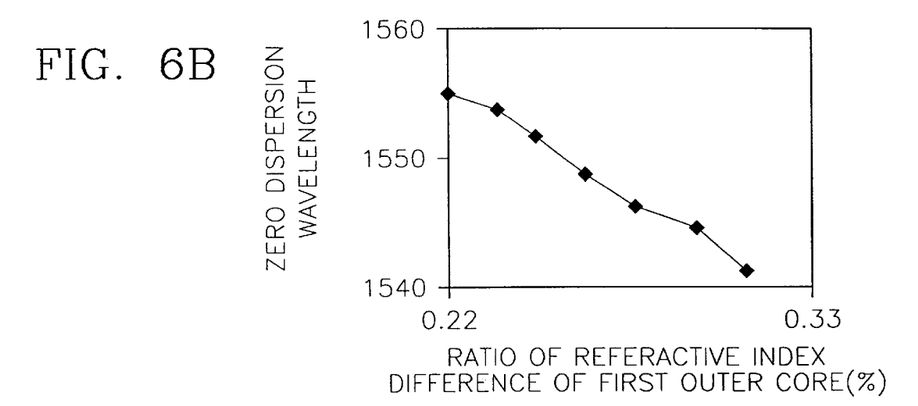
Figure 6C:
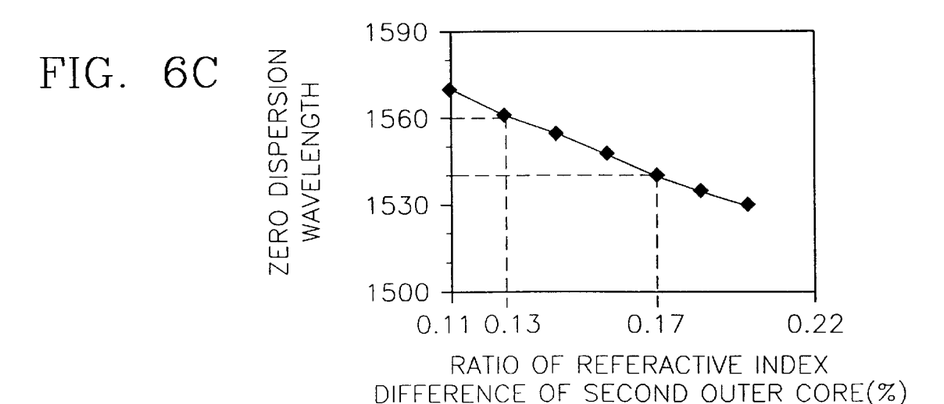

FIGS. 6A through 6C are graphs illustrating the relationship between the ratio of refractive index difference (%) of the central core 2 and a zero dispersion wavelength (nm), the relationship between the ratio of refractive index difference (%) of the first outer core 4 and the zero dispersion wavelength (nm), and the relationship between the ratio of refractive index difference (%) of the second outer core and the zero dispersion wavelength (nm), respectively. Referring to FIG. 6A, when the ratio of refractive index difference ($\Delta 1 = (n_1 - n_0)/n_1$) of the central core 2 with respect to the refractive index of the cladding 8 is 0.74%, the zero dispersion wavelength is 1540 nm. When the ratio of refractive index difference ($\Delta 1$) is 0.81%, the zero dispersion wavelength is 1560 nm. In order to make the zero dispersion wavelength between 1540 nm and 1560 nm, the ratio of refractive index difference ($\Delta 2 = (n_2 - n_0)/n_2$) of the first outer core 4 with respect to the refractive index of the cladding 8 must be between 0.22% and 0.33%, and the ratio of refractive index difference ($\Delta 3 = (n_3 - n_0)/n_3$) of the second outer core 6 with respect to the refractive index of the cladding 8 must be between 0.13% and 0.17%.

Figure 7A:
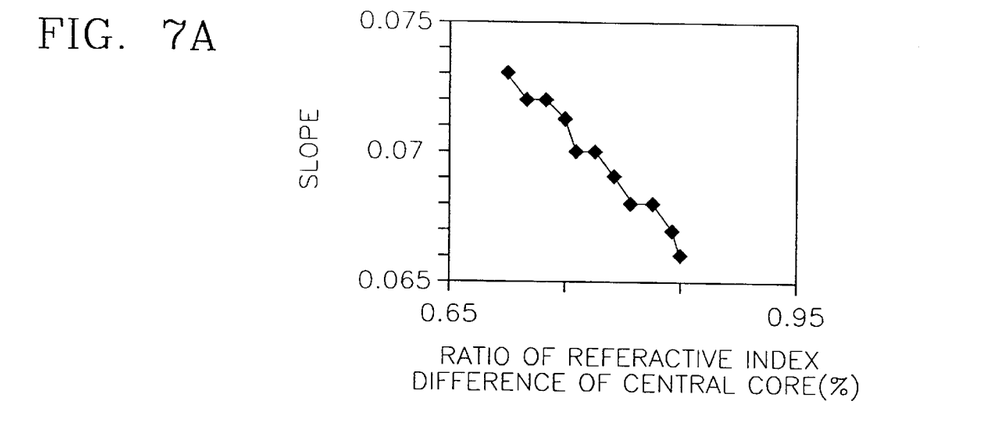
FIGS. 7A through 7C are graphs illustrating the relationship between the ratio of refractive index difference of the central core and a zero dispersion slope, the relationship between the ratio of refractive index difference of the first outer core and the zero dispersion slope, and the relationship between the ratio of refractive index difference of the second outer core and the zero dispersion slope, respectively.
Figure 7B:
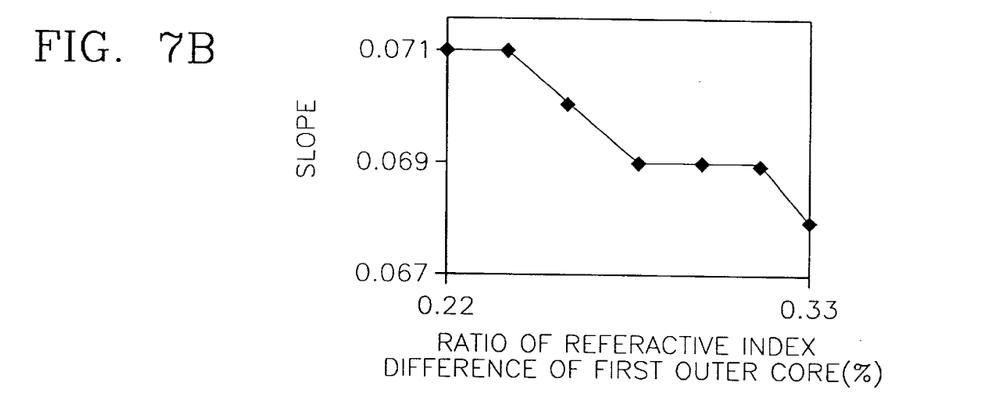
Figure 7C:
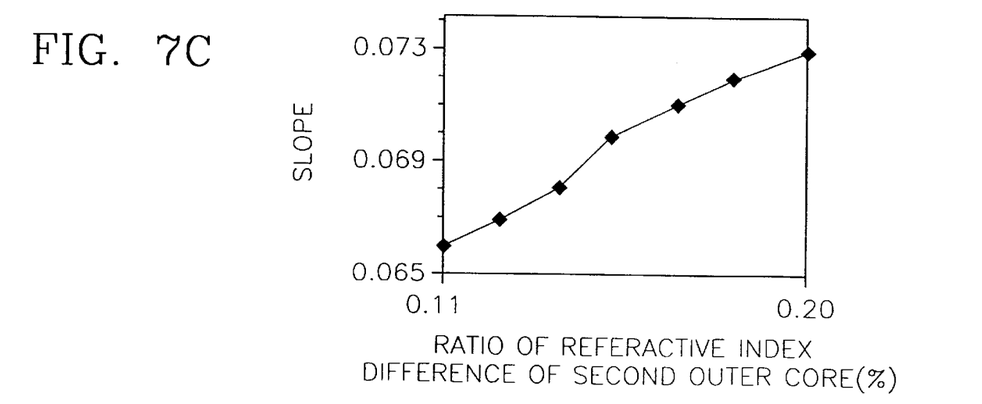

FIGS. 7A through 7C are graphs illustrating the relationship between the ratio of refractive index difference (%) of the central core 2 and a zero dispersion slope (ps/nm$^2$/Km), the relationship between the ratio of refractive index difference (%) of the first outer core 4 and the zero dispersion slope (ps/nm$^2$/Km), and the relationship between the ratio of refractive index difference (%) of the second outer core 6 and the zero dispersion slope (ps/nm$^2$/Km), respectively. It can be seen that a zero dispersion slope exists about between 0.068 and 0.072 in the range of the ratio of refractive index difference allowing the zero dispersion wavelength to exist between 1540 nm and 1560 nm.

In the optical fiber according to the present invention, the cladding is formed of pure silica (SiO$_2$), the central core 2 and the first outer core 4 are formed of pure silica and germanium dioxide, i.e., SiO$_2$—GeO$_2$, or pure silica, germanium dioxide and fluorine, i.e., SiO$_2$—GeO$_2$—F, and the second outer core 6 is formed of SiO$_2$—GeO$_2$—F. Here, a mole percentage of phosphorus pentoxide (P$_2$O$_5$) or less can be added to the second outer core 6.

In the present invention, the core is separated into a central core, at least two outer cores, which have a refractive index lower than the refractive index of the central core and sequentially surround the central core, are formed on the outer circumference of the central core. The diameter and refractive index of the core must be regulated to control the dispersion. The present invention has a core comprised of multiple layers, thereby allowing easier control of optical characteristics and easier production of many optical fiber preforms having the same characteristics.

Figure 8A:
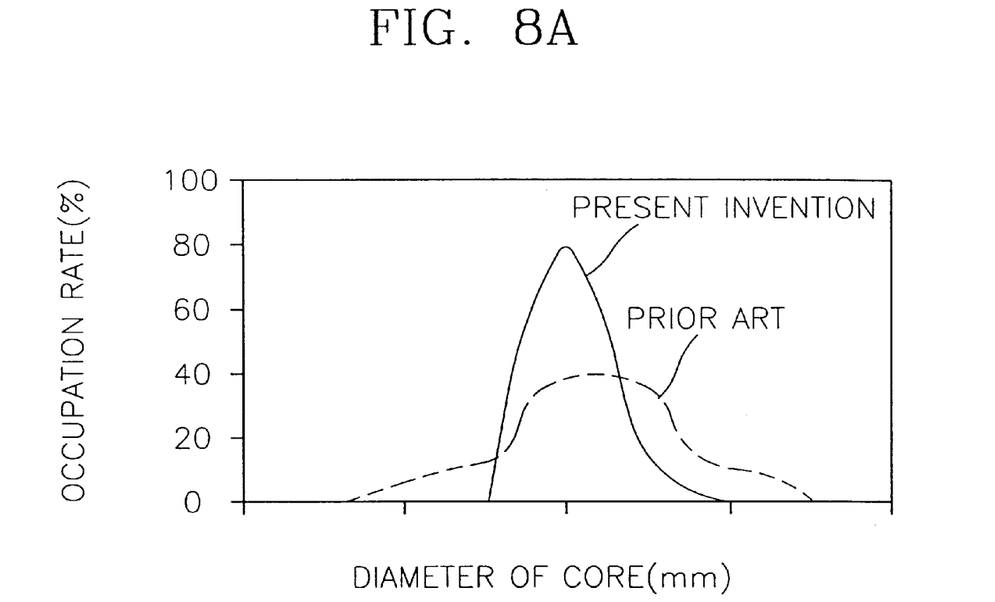
FIGS. 8A and 8B are graphs illustrating the comparison of the prior art with the present invention with respect to the reproducibility of a preform having a desired core diameter, and that of a material having a desired core refractive index.
Figure 8B:
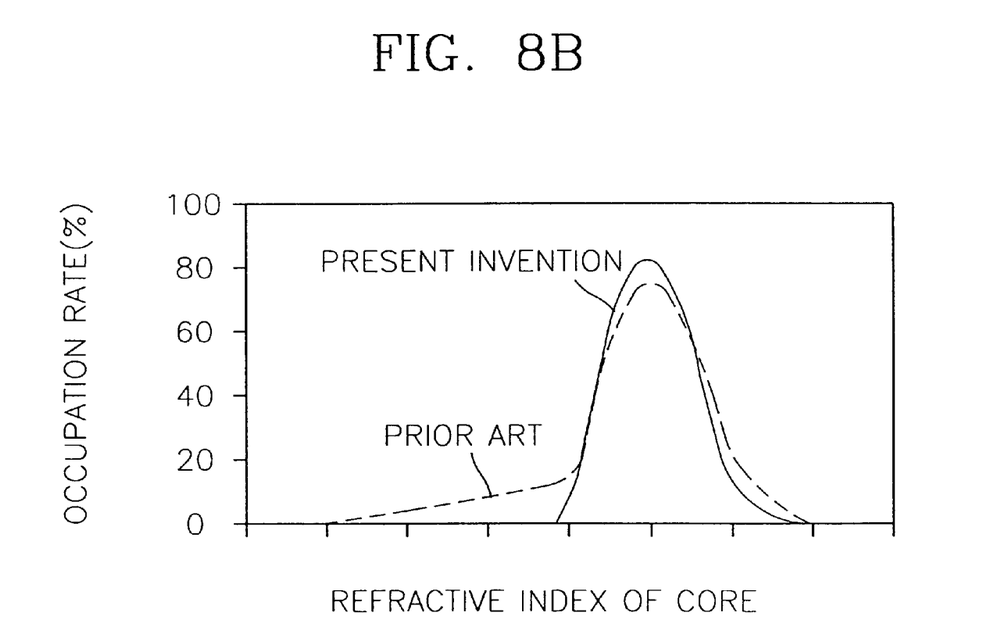

FIG. 8A is a graph illustrating the comparison of the prior art with the present invention with respect to how many preforms having a target core diameter can be reproduced when a plurality of preforms are fabricated. FIG. 8B is a graph illustrating the comparison of the prior art with the present invention with respect to how many preforms having a target core refractive index can be reproduced when a plurality of preforms are fabricated. Here, the horizontal axes of FIGS. 8A and 8B are respectively a core diameter (mm) and a core refractive index, and the vertical axes thereof are the occupation rate (%) of the preform.

Referring to FIG. 8A, when distribution of the refractive index of the preform according to an embodiment of the present invention is employed, more optical fiber preforms having a target core diameter can be manufactured than when the prior art is employed. Referring to FIG. 8B, when distribution of the refractive index of the preform according to an embodiment of the present invention is employed, more optical fiber preforms having a target core refractive index can be manufactured than when the prior art is employed.

The present invention was described by taking a concrete embodiment as an example, but it is apparent that various modifications may be effected within the scope of the present invention. Therefore, the scope of the present invention must not be limited to the above-described embodiment, and must be determined by not only the scope of the attached claims but also the equivalents thereof.

According to the present invention as described above, a single-mode optical fiber having a core and a cladding has a large core diameter by making the refractive index distribution of the core multi-stepped, thus resulting in easy fabrication. Also, the connection loss of the optical fiber can be reduced by increasing the diameter of a mode field. Furthermore, the optical fiber has a structure which can be easily fabricated, and a low dispersion value at a wavelength of 1550 nm, so that it can perform super-speed long distance communications.

According to the multi-step core structure of the optical fiber of the present invention, the optical characteristics of the optical fiber including the dispersion can be easily changed by varying the refractive index difference of each core, the refractive index shape thereof, and the diameter thereof.

Also, even when an optical fiber having the same structure as in the present invention is fabricated by MCVD by which center dip generally exists at the center of a core, the optical characteristics are not sensitive to a fine change in the core refractive index and core diameter due to the center dip.

What is claimed is:

1. A single mode optical fiber comprising:
    a central core having a predetermined first radius from a central axis and a first refractive index;
    a first outer core adjacent the central core, the first outer core having a second radius larger than the first radius and a second refractive index smaller than the first refractive index;
    a second outer core adjacent the first outer core, the second outer core having a third radius larger than the second radius and a third refractive index smaller than the second refractive index; and a cladding adjacent the second outer core, the cladding having a fourth radius larger than the third radius and a fourth refractive index smaller than the third refractive index, wherein the refractive index distributions of the central core, the first outer core, and the second outer core are one of refractive index distributions expressed by the following equation:

$$n(r) = n_1\left(1 - \Delta\left(\frac{r}{a}\right)^\alpha\right)$$

wherein r is the radius, a is the radius of a core, $\alpha$ is the refractive index profile parameter, $n_1$ is the refractive index at the center of the optical fiber, $\Delta=(n_1-n_2)/n_1$, and $n_2$ is the cladding index, characterized in that:

when $\alpha$ is equal to 1, the refractive index profile is triangular;

when $\alpha$ is equal to 2, the refractive index profile has a hill shape; and when $\alpha$ is equal to $\infty$, the refractive index profile is stepped, and further characterized in that the ratios of refractive index difference of the central core, the first outer core, and the second outer core with respect to the refractive index of the cladding are 0.74–0.81%, 0.23–0.30%, and 0.13–0.17%, respectively.

2. The single mode optical fiber as claimed in claim 1, wherein the cladding is formed of pure silica, $SiO_2$, and the central core and the first and second outer cores are all formed of pure silica and germanium dioxide, $SiO_2$—$GeO_2$.

3. The single mode optical fiber as claimed in claim 2, wherein the first and second outer cores are formed of pure silica, germanium dioxide and fluorine, $SiO_2$—$GeO_2$—F.

4. The single mode optical fiber as claimed in claim 2, wherein the first and second outer cores are formed of pure silica, germanium dioxide, phosphorus pentoxide and fluorine, $SiO_2$—$GeO_2$—$P_2O_5$—F.

5. The single mode optical fiber as claimed in claim 1, wherein a zero dispersion wavelength exists between 1500 nm and 1600 nm, and a zero dispersion slope is from 0.068 to 0.072 ps/nm$^2$/km.

6. The single mode optical fiber as claimed in claim 1, wherein the central core, the first outer core, and the second outer core have diameters of 3.3–3.9 $\mu$m, 4.4–5.2 $\mu$m, and 17.5–23.5 $\mu$m, respectively.

7. A method of fabricating a single mode optical fiber, comprising the steps of:

forming a central core having a predetermined diameter and a predetermined refractive index;

forming a first outer core adjacent to and surrounding the central core, the first outer core having a refractive index smaller than the refractive index of the central core;

forming a second outer core adjacent to and surrounding the first outer core, the second outer core having a refractive index smaller than the refractive index of the first outer core; and forming a cladding adjacent to and surrounding the second outer core, the cladding having a refractive index smaller than the refractive index of the second outer core, wherein ratios of refractive index difference of the central core, the first outer core, and the second outer core with respect to the refractive index of the cladding are 0.74–0.81%, 0.23–0.30%, and 0.13–0.17%, respectively.

8. The method of fabricating a single mode optical fiber as claimed in claim 7, wherein the diameters of the central core, the first outer core, and the second outer core are 3.3–3.9 $\mu$m, 4.4–5.2 $\mu$m, and 17.5–23.5 $\mu$m, respectively.

* * * * *